United States Patent [19]
Daniel et al.

[11] Patent Number: 5,987,258
[45] Date of Patent: Nov. 16, 1999

[54] REGISTER RESERVATION METHOD FOR FAST CONTEXT SWITCHING IN MICROPROCESSORS

[75] Inventors: Thomas Daniel, Los Altos; Anil Gupta, Fremont, both of Calif.

[73] Assignee: LSI Logic Corporation, Milpitas, Calif.

[21] Appl. No.: 08/883,137

[22] Filed: Jun. 27, 1997

[51] Int. Cl.⁶ .................................................. G06F 9/45
[52] U.S. Cl. .................... 395/709; 395/705; 710/260; 712/228
[58] Field of Search .................... 395/705, 706, 395/707, 708, 709, 733, 735, 736, 678; 709/107, 108; 712/228; 710/260, 262, 263, 266, 269

[56] References Cited

U.S. PATENT DOCUMENTS

| | | | |
|---|---|---|---|
| 5,386,563 | 1/1995 | Thomas | 395/569 |
| 5,530,873 | 6/1996 | Takano | 710/260 |
| 5,644,772 | 7/1997 | Mann | 710/260 |
| 5,717,933 | 2/1998 | Mann | 710/262 |
| 5,815,701 | 9/1998 | Slavenberg | 395/591 |

*Primary Examiner*—Tariq R. Hafiz
*Assistant Examiner*—Kakali Chaki
*Attorney, Agent, or Firm*—Oppenheimer Wolff & Donnelly LLP

[57] ABSTRACT

Microprocessor main programs and their interrupt handling routines are written in a high level programming language such as C. Each is compiled separately, and each is compiled invoking a compiler option which commands the compiler to not use a given set of registers in the compiled code. Post-processing is then performed on the compiled interrupt code to replace accesses to a first set of registers with accesses to the given set of registers. The result is that while both the main program and the interrupt handler were written in C, the compiled code for each employs different registers. This allows context switching from the main program to the interrupt handler and back again with almost none of the overhead traditionally associated with context switching register save and restore operations during exception handling.

19 Claims, 3 Drawing Sheets

REGISTER RESERVATION METHOD FOR FAST CONTEXT SWITCHING IN MICROPROCESSORS

BACKGROUND OF THE INVENTION

1. Field of the Invention

The present invention relates to the field of microprocessor software. More particularly, the present invention relates to the field of a register reservation method for context switching in microprocessors.

2. Description of the Related Art

In microprocessors, registers are memory locations which are located on the microprocessor die and which are quickly accessible for data storage, retrieval, and manipulation. Microprocessors use a number of registers. A MIPS processor without a floating point coprocessor for example has 32 general purpose registers. In accordance with register conventions followed by most software compilers, these registers are assigned the functions described below:

| Register Number | Mnemonic | Description |
| --- | --- | --- |
| $0 | zero | Hardwired to zero |
| $1 | at | Reserved for assembler |
| $2–$3 | v0–v1 | Return value from functions |
| $4–$7 | a0–a3 | Arguments for functions |
| $8–$15 | t0–t7 | Temporaries, not preserved in functions |
| $16–$23 | s0–s7 | Variables, preserved in functions |
| $24–$25 | ti–to | Temporaries, not preserved in functions |
| $26–$27 | k0–k1 | Reserved for exception processinq |
| $28 | gp | Global pointer for fast addressing of global variables |
| $29 | sp | Stack pointer |
| $30 | fp | Frame pointer |
| $31 | ra | Return address |

The processor also has two special registers (HI and LO) used for multiplication and division operations.

Microprocessors also include interrupt capabilities. An interrupt input to a microprocessor is an input pin on the microprocessor chip itself. When a device external to the microprocessor drives the input pin to an active state (usually active low), the controller receives an immediate signal that a device is requesting service. The interrupt source requesting service might be a data port that has received incoming data, an A/D converter that has finished a conversion and therefore has data available for retrieval by the processor, an overtemperature alarm indicator, a mouse, a keyboard, or any other number of devices that need servicing by the processor. Interrupts can also be generated internally upon the occurrence of various conditions.

Interrupts are useful means to deviate the standard control flow of a program in order to service an external or internal event that may occur asynchronously. When an interrupt occurs, the processor temporarily abandons the current program flow and begins to fetch and execute instructions from a different location. This location may be either a static, predetermined address (non-vectored interrupts) or an address supplied by a hardware unit (vectored interrupts). The routine that the processor jumps to after receiving an interrupt is called an exception or interrupt routine or handler. The microprocessor can enable and disable interrupts via software. If an interrupt disable command has been executed, the microprocessor will not recognize the interrupt and jump to the interrupt routine until an interrupt enable command is executed.

When the processor jumps from the main (interrupted) program to the interrupt handler, the interrupt handler does not know what processor resources were being used by the main program. In order to prevent loss of the register data which the main program may have been using and to allow continuation of the main program after the interrupt has been handled and program execution returned to the main program, the interrupt handler has to save the data currently residing in the processor registers that it will be using and restore that data to those registers upon completion of the interrupt routine. The process of saving and restoring registers during exception handling is called context switching. Saving the registers at the beginning of the exception handler is called context saving. Restoring the registers before returning to the main program is called context restoring.

There are several different methods for performing context switching. Some processors, particularly digital signal processors (DSP's), perform context switching via shadow registers. In this method, for each main register there is an associated shadow register. A shadow register is a hardware location which is directly connected to the main register. The main registers are used during normal program execution. When an interrupt occurs, the shadow register contents are swapped with the main register contents and the interrupt handler proper may proceed immediately. Upon completion the main and shadow registers are swapped again and the interrupted program may resume.

This is the fastest interrupt handling method. However, not all processors support register shadowing. Also, due do a limited number of shadow registers, only a limited number of fast context switches may be performed.

A second method of context switching is software context save/restore. In this method, the main registers are saved via software commands at the beginning of an interrupt routine, and restored via software commands at the end of the interrupt routine. If the interrupt handler is being written in a high level programming language such as C which does not allow a programmer to specify which particular registers to use for the routine, an assembly wrapper as illustrated in FIG. 1 is invoked. The assembly wrapper simply saves and restores all of the registers. This is time-consuming. For example, the MIPS processor has 20 registers that must be saved and restored before and after the interrupt handler proper. This method will also be inefficient if the interrupt routine uses only a few registers. This inefficiency will be felt even more acutely if the interrupt routine is called often during program execution.

One variation on this method is to write the interrupt handler in assembly language so that the programmer can control which registers are used for the interrupt handler. The programmer adds register save and restore commands which save and restore only those registers that will be used during the exception routine. Although this is more efficient in terms of processor resources, writing software in assembly is significantly more time-consuming and error-prone than coding in a high level programming language such as C.

A third method of context switching is hardware context save/restore. In this method, hardware automatically performs the context save when the interrupt is accepted, and automatically performs the context restore at the end of the interrupt routine. Although typically faster than software controlled context switching, hardware context save/restore may also require a significant amount of time due to the number of registers to be saved. Furthermore, not all processors support hardware context switching.

SUMMARY OF THE INVENTION

A need exists for an improved method of context switching. Accordingly, it is an object of the present invention to provide an improved register reservation method which allows interrupts to be handled with less of the overhead traditionally associated with context switching.

It is a further object of the invention to provide a method of context switching that allows exception routines to be written in high level languages without the context switching time overhead normally associated with assembly wrappers.

In accordance with the above listed objects and others, the present invention provides for an improved method of context switching in microprocessors. The method of the present invention allows interrupt handlers to be written in a high level language such as C while allowing context switching times associated with interrupt processing to be reduced to nearly zero.

The invention makes use of the observation that compilers typically uses only a small subset of all available registers for most operations. Therefore it is possible to reserve part of the register set to the interrupt handler while the rest of the registers are used by the main program. This arrangement allows one to eliminate the time consuming process of saving and restoring the registers at the interrupt handler entry and exit points. With appropriate techniques it is also possible to perform this register reservation while writing the bulk of the interrupt handler code in C or other high level programming language.

In one aspect, the present invention is directed to a method of decreasing interrupt handling overhead time in a processor-based system by eliminating context save and restore operations, the system including a processor having registers comprising a first register set and a second register set, the method comprising the steps of: providing an interrupt routine in a high level programming language; processing the interrupt routine to executable interrupt code such that the executable interrupt code is prevented from employing registers from the first register set and is permitted to employ registers from the second register set, the executable interrupt code not performing a context save and a context restore with respect to all of the registers; and providing a main executable program, the main executable program not storing critical data in registers from the second register set when the interrupt routine is enabled. More specifically, the main program and interrupt handlers are both written in a high level programming language. The main program is compiled, invoking the register reserve option that is available in some commercially available compilers such as the GNU C compiler to not use any of the registers within a certain register set. The interrupt handler is also compiled invoking the same option. After the interrupt handler is compiled, the compiled code is then post-processed by replacing register accesses within the interrupt handler to accesses of only those registers which the main program has been prevented from employing. The result is that the main program and the interrupt handler each use a different set of registers. Because they use different registers, it is no longer necessary to perform a context save when switching program flow to the interrupt handler. Similarly, the context restore at the end of the interrupt handler is also obviated.

These and other features and advantages of the present invention will be apparent to those skilled in the art from the following detailed description of a preferred illustrative embodiment and claims, taken together with the accompanying drawings.

DETAILED DESCRIPTION OF THE PREFERRED EMBODIMENTS

Figure 1:
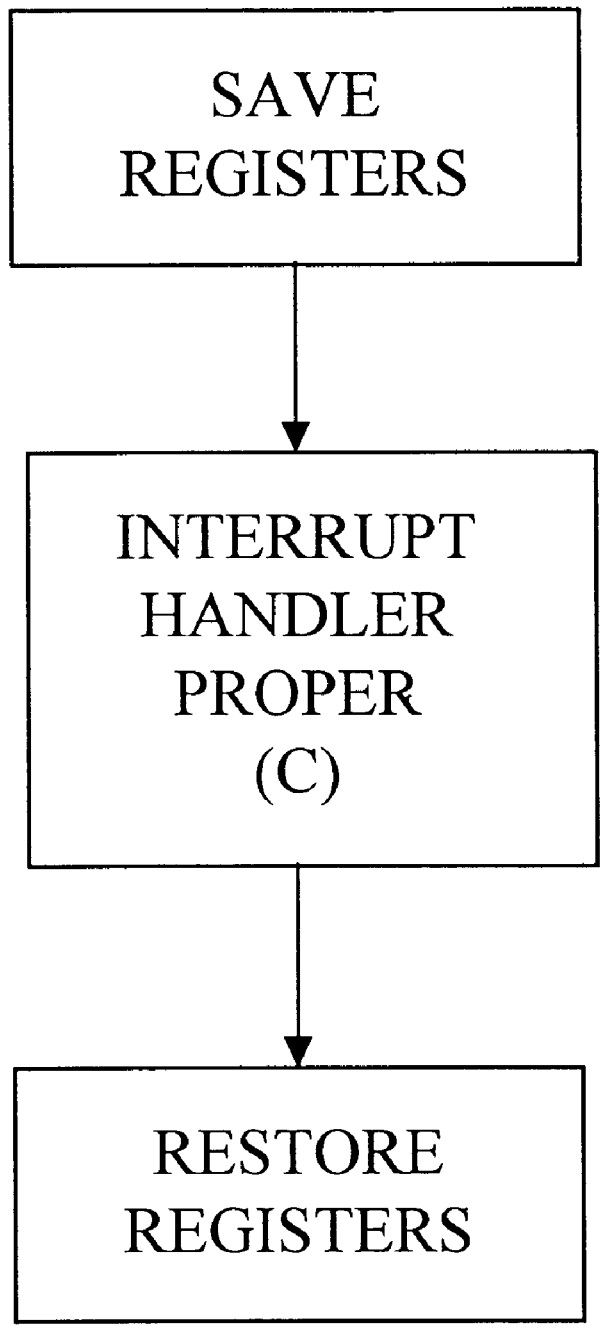
FIG. 1 is a flow diagram showing execution of the prior art assembly wrapper method for performing context switching.

For purposes of illustrating the present invention, the MIPS processor discussed earlier will be used as an illustrative example. In the MIPS processor, register $zero is hardwired to zero. Register $ra is used by jump and link instructions for function calls. Other than these two registers $zero and $ra, all other registers are logically equivalent, i.e., the hardware does not treat one any differently than the others. The MIPS registers can be conceptually divided into three different classes of registers as follows.

Class 0 (the zeroeth register set) contains those registers that either cannot or need not be remapped. Specifically, class 0 contains six registers in the example: $zero, $ra, $gp, $sp, $k0, and $k1. Registers $zero and $ra are hardware constrained and cannot be remapped. Register $gp is used for fast addressing of global data. It is often the same for the interrupt handlers and the main program and therefore does not need to be remapped. Similarly, register $sp may be used both by the interrupt handler and the main program. Registers $k0 and $k1 are used at the beginning of the exception handler and cannot be remapped.

| Class 1 (the first register set) contains the twelve most often used registers. These are: | | |
|---|---|---|
| $1 | at | Reserved for assembler |
| $2 | v0 | Return value from functions |
| $4–$7 | a0–a3 | Arguments for functions |
| $8–$10 | t0–t2 | Temporary variables, not saved in functions |
| $16–$19 | s0–s3 | Variables, saved in functions |
| Class 2 (the second register set) contains twelve lesser used registers: | | |
| $3 | v1 | Return value from functions |
| $11–$15 | t3–t7 | Temporary variables,- not preserved in functions. |
| $24–$25 | t8–t9 | Temporary variables, not preserved in functions |
| $20–$23 | s4–s7 | Variables preserved in functions |
| $30 | fp | frame pointer |

It is noted that other than registers $zero and $ra, all other registers are equivalent from a hardware perspective. The register functional allocations described earlier are purely a function of software. It would be possible to create a compiler that does not follow these conventions. Programs created from such a compiler would execute correctly although it would not be possible to call or be called from standard compiler programs.

Both the main program and the interrupt handler are compiled to executable code, invoking the compiler option that is available with some compilers to disable usage of registers from class 2, while permitting usage of registers from classes 0 and 1. Different compilers have different names for this option. For present purposes, this option will be referred to generically as the register reserve option, regardless of the particular compiler being used. The register reserve option was designed and has been used previously to dedicate particular registers to particular variables. The programmer wrote source code that commanded the compiler to place a particular chosen variable into a particular designated register, and then invoked the register reserve option at compilation time to prevent the compiler from using that particular register for any other data. This allowed the program to ensure that the particular chosen variable was always close at hand in a register, and was not "bumped" into main memory by the register being allocated to hold a new variable.

After compiling with the register reserve option, the interrupt handler executable code is post-processed and all accesses to class 1 registers are replaced by accesses to class 2 registers. For example, the registers may be remapped as follows:

| at→t3 | t0→t5 | t2→t7 | v0→t4 | t1→t6 |
| s0→s4 | s1→s5 | s2→s6 | s3→s7 | |

Figure 2:
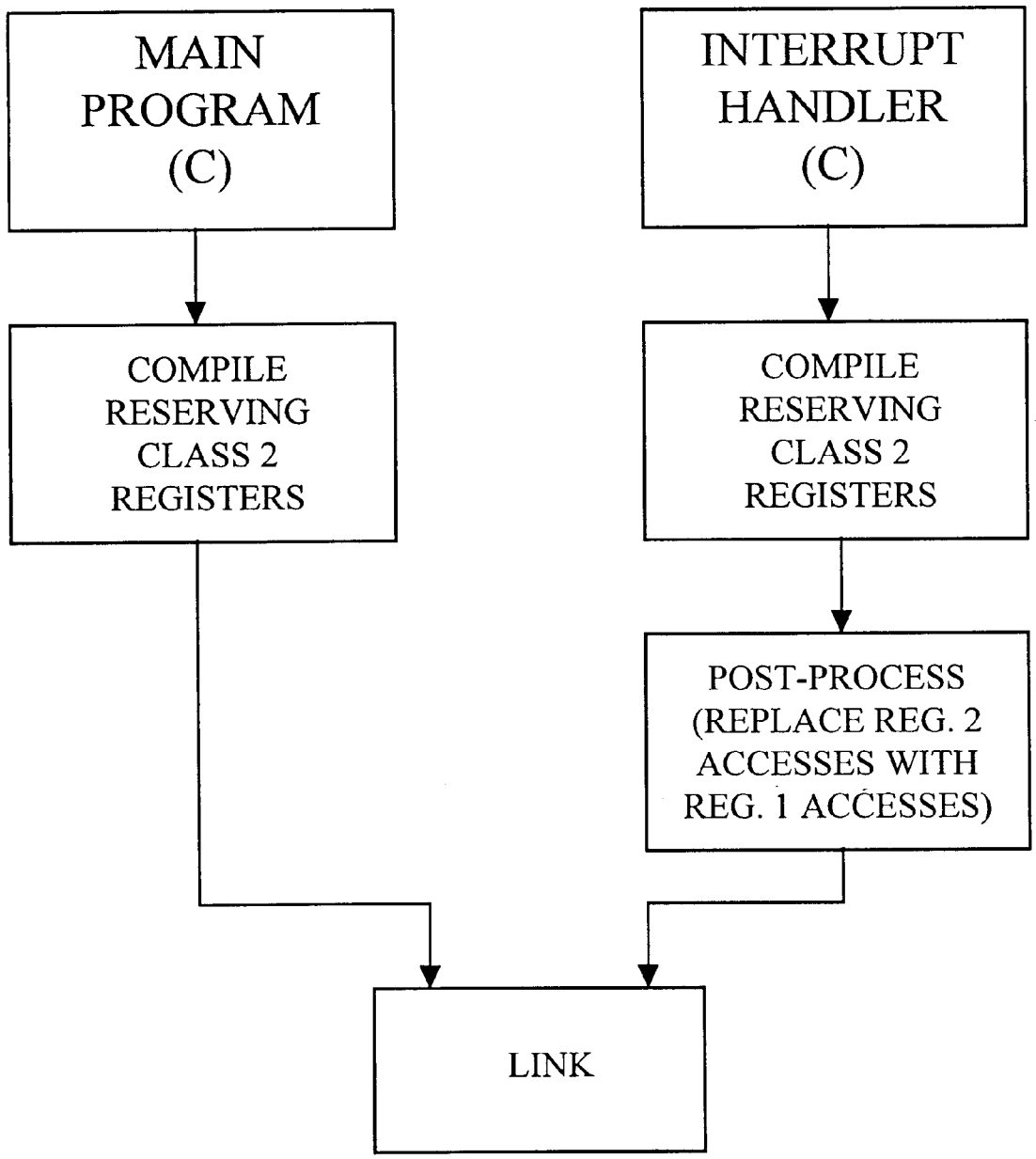
FIG. 2 is a flow diagram showing compilation flow for the present invention.

Other remappings are possible, provided that the remapping is unique. In terms of compilation, the flow is illustrated in FIG. 2, and is as follows:

1. Compile interrupt handler to assembly code disabling usage of registers from class 2;
2. Post-process the assembly interrupt handler code replacing all occurrences of registers from class 1 with registers from class 2 using a mapping such as the example given above;
3. Compile the interrupt handler assembly code to object code;
4. Compile the main program to main program object code, disabling usage of registers from class 2; and
5. Link and execute the entire program.

The post-processing can be done either in the assembly code or in object (machine) code. In most cases it will be preferred to post-process the assembly code. This is because the object code contains more information than the bare assembly code, so manipulating the object code is usually more complicated. However, the post-processing can be performed in either assembly or object code, and doing either is within the scope of the present invention.

For purposes of the present invention both assembly and object code will be referred to as executable code, so the process more generally comprises the steps of:

1. Compile exception handler code to executable code disabling usage of registers from class 2;
2. Post-process the executable exception code, replacing all occurrences of registers from class 1 with registers from class 2 using a mapping such as the example given above;
3. Compile the main program to main program executable code, disabling usage of registers from class 2; and
4. Link and execute the entire program.

Figure 3:
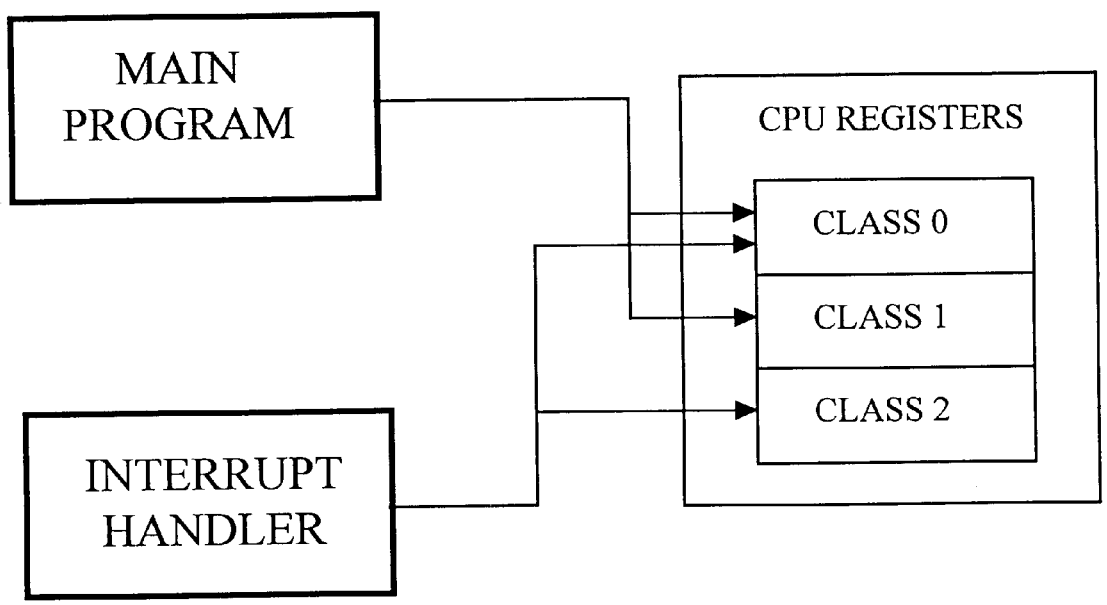
FIG. 3 is a register access diagram for programs prepared according to the present invention.

The linked program is stored on a machine readable memory such as magnetic tape, CD ROM, or Read Only Memory (ROM) including Programmable ROM and other types of ROM. The program is loaded into the processor and executed from memory. This memory may be ROM, Random Access Memory (RAM), or other memory types. During execution the main program uses only registers from class 0 and class 1. The main program does not employ registers from class 2. The interrupt handler, on the other hand, does not use registers from class 1. Thus, when program control switches from the main program to the interrupt handler in response to an interrupt being received, context save and restore operations are no longer required. The register access diagram is shown in FIG. 3.

It is not absolutely necessary that the main program never store any information at all in class 2 registers. It is only necessary to keep the main program from employing class 2 registers during times when program flow may jump to the exception routine. Because most processors allow interrupts to be enabled and disabled, it would be possible for the processor to employ class 2 registers during a period when the interrupt is disabled (an "interrupt enabled period"). Thus, it is possible for the programmer to use class 2 registers for routines which will require more than just the class 1 registers, provided that the programmer knows that he can safely disable the interrupts during the routine and enabled the interrupts at the end of the routine. In such a case, the programmer would compile separately the routines during which interrupts will be enabled, without invoking the register reserve option at compilation time. Whether the interrupts can be safely disabled will depend on how long the main program will spend with its interrupts disabled, the minimum interrupt response time that is required, and other constraints well known within the programming arts. After the interrupts have been re-enabled, it does not matter that residual data has been left by the main program in class 2 registers provided that the residual data is not critical, i.e., the main program will not be expecting to find valid data within those registers.

At present, commercially available compilers allow one to disable only use of registers from class 2. Compilers are not available that allow one to disable registers from class 1. It would be desirable to write such a compiler, so that interrupt routines can be directly compiled to use only class 2 registers without having to post-process the interrupt handler executable code. Until such compilers become available, the compiled code will have to continue to be post-processed as discussed above. The post-processing is not particularly cumbersome, as computer programs can be easily written to perform the simple register mapping and substitution necessary. If the interrupt routine is short, the required post-processing can be easily performed in assembly language by hand.

The method of the present invention enjoys two main advantages over prior art context switching techniques. First, it allows very fast context switching by eliminating context save and context restore operations. This allows the context switching overhead normally associated with exception handling to be reduced to virtually zero. Second, the present invention allows interrupt routines to be written in C or other high level language. This eliminates the prior need to write interrupt handlers in assembly language for those interrupt routines for which context switching overhead must be kept to a minimum.

Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the methods of the present invention may be applied to others processors having a different number or arrangement of registers, and to code written in other programming languages. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method of decreasing interrupt handling overhead time in a processor-based system by eliminating context save and context restore operations associated with interrupt handler routines, the system including a processor, the processor having a first register set and a second register set, the method comprising the steps of:

(a) providing an interrupt handler in a high level programming language;

(b) providing a main program in the high level programming language;

(c) compiling the interrupt handler into interrupt handler assembly code;

(d) post-processing the interrupt handler assembly code by replacing accesses to the first register set with accesses to the second register set;

(e) compiling the interrupt handler assembly code into interrupt handler object code;

(e) compiling the main program into main program object code, the main program compiling step including the substep of invoking a compiler option which commands the compiler not to use the second register set; and (f) linking the post-processed interrupt handler object code and the main program object code.

2. The method of claim 1 wherein:
the interrupt handler object code does not perform context save and context restore operations.

3. The method of claim 1 wherein:
the main program object code does not store critical information in registers within the second register when the interrupt handler is enabled.

4. The method of claim 3 wherein:
the main program object codes does not store any information within registers within the second register set.

5. A method of decreasing exception handling overhead time in a processor-based system by eliminating context save and context restore operations, the system including a processor having registers comprising a first register set and a second register set, the method comprising the steps of:

(a) providing an exception routine in a high level programming language;

(b) processing said exception routine to executable exception code such that said executable exception code is prevented from employing registers from the first register set and is permitted to employ registers from the second register set, the executable exception code not performing a context save and a context restore with respect to all of the registers; and (c) providing a main executable program, the main executable program not storing critical data in registers from the second register set when said exception routine is enabled.

6. The method of claim 5 wherein:
the executable exception code does not perform a context save and context restore with respect to any registers.

7. The method of claim 6 wherein step (c) further comprises the substeps of:

(c1) providing a main program source code in a high level assembly language; and (c2) commanding a compiler to compile said main program source code to main program executable code such that said main program executable code is prevented from employing registers from the second register set when the exception routine is enabled.

8. The method of claim 5 wherein step (b) comprises the substeps of:

(b1) commanding a compiler to compile said exception routine to executable exception code such that said executable exception code is prevented from employing registers from the second register set; and (b2) post-processing said executable exception code by replacing accesses to said first register set with accesses to said second register set.

9. The method of claim 8 wherein:
the executable exception code in substeps (b1) and (b2) is interrupt assembly code; and wherein step (b) further comprises the substep of:

(b3) compiling said interrupt assembly code to interrupt object code.

10. The method of claim 5 wherein step (b) comprises the step of:
commanding a compiler to compile said exception routine to executable exception code such that said executable exception code is prevented from employing registers from the first register set.

11. The method of claim 10 wherein step (c) comprises the substeps of:

(c1) providing a main program source code;

(c2) compiling said main program source code to main program executable code such that said main program executable code is prevented from employing registers from the second register set.

12. The method of claim 11 wherein substep (c2) comprises the step of:
commanding a register reserve option when compiling the main program source code.

13. The method of claim 5 further comprising the step of (d) executing the main executable program in conjunction with said executable exception code.

14. A machine readable memory containing executable code produced according to the method of claim 5.

15. An electronic processing system comprising:
a processor;
the machine readable memory according to claim 14; and
an interrupt source for causing said executable exception code to be invoked.

16. A read only memory containing executable code produced according to the method of claim 5.

17. A random access memory containing executable code produced according to the method of claim 5.

18. An electronic system for preparing and executing a processor program which executes interrupt routines and main program at substantially reduced context switching times, the system comprising:
a compiler for compiling a source interrupt routine to a compiled interrupt routine;
means for post-processing the compiled interrupt routine to prevent the compiled interrupt routine from writing data into registers within a first register set; and
means for compiling a source main program such that a resulting compiled main program employs registers from the first register set and does not employ registers from a second register set at an interrupt enabled portion of said compiled main program; and
means for executing together said compiled main program and said compiled interrupt routine.

19. The system of claim 18 wherein said post-processing means comprises:
means for replacing accesses to the first register set with accesses to a second register set.

* * * * *